Inventors:
Patrick J. Longe
William A. Root
By
Attys.

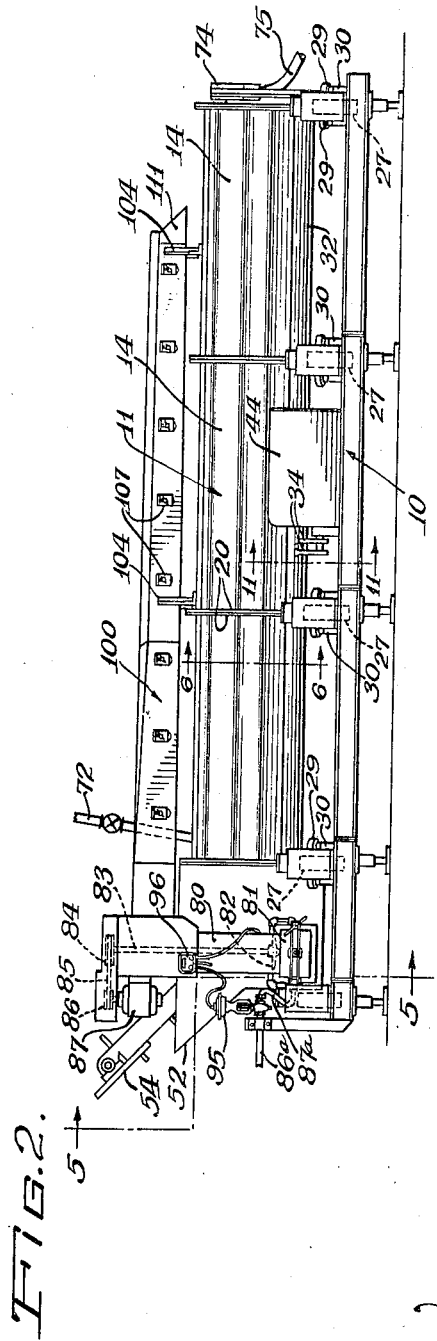
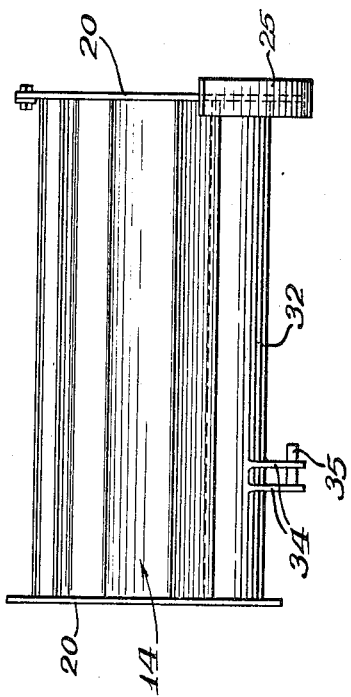

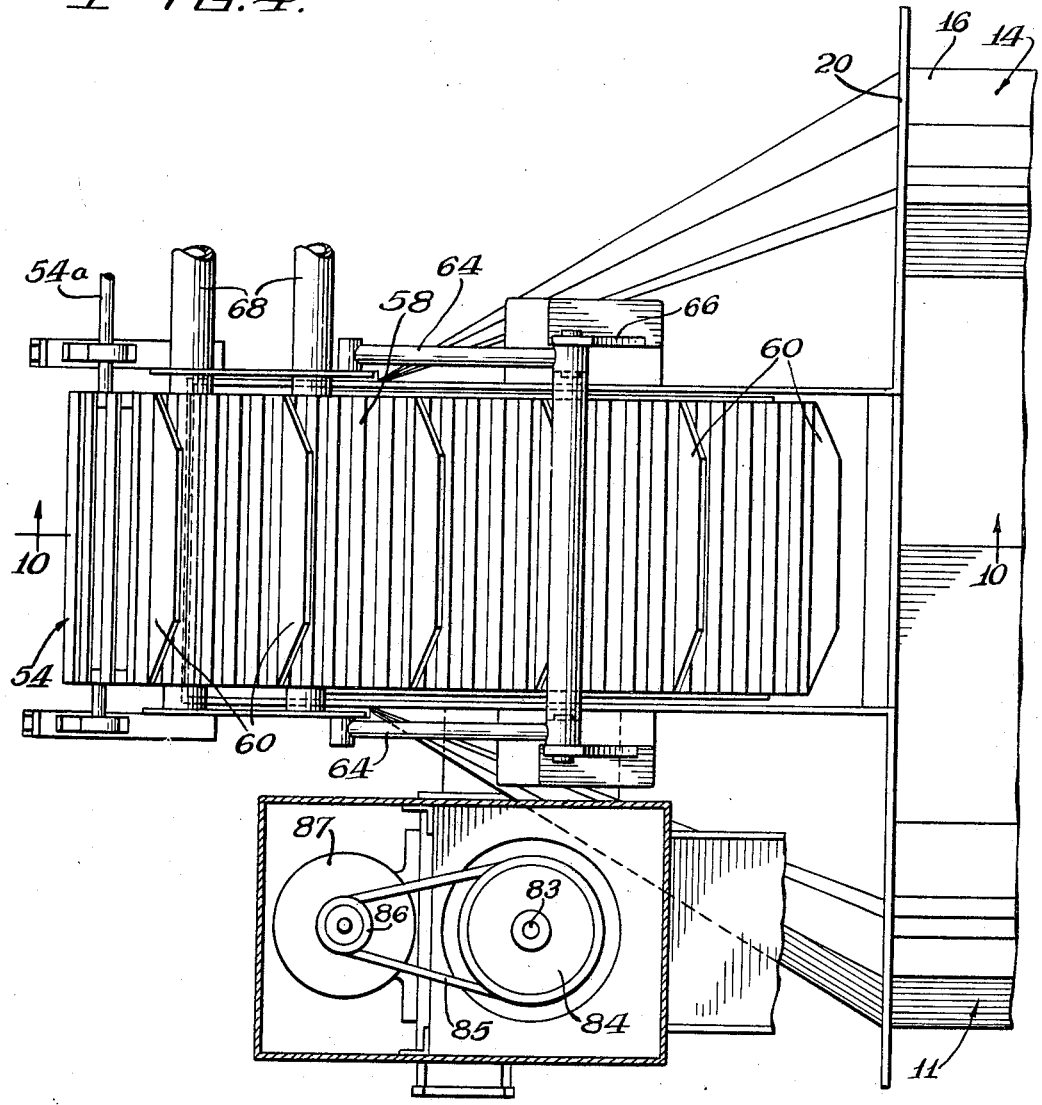

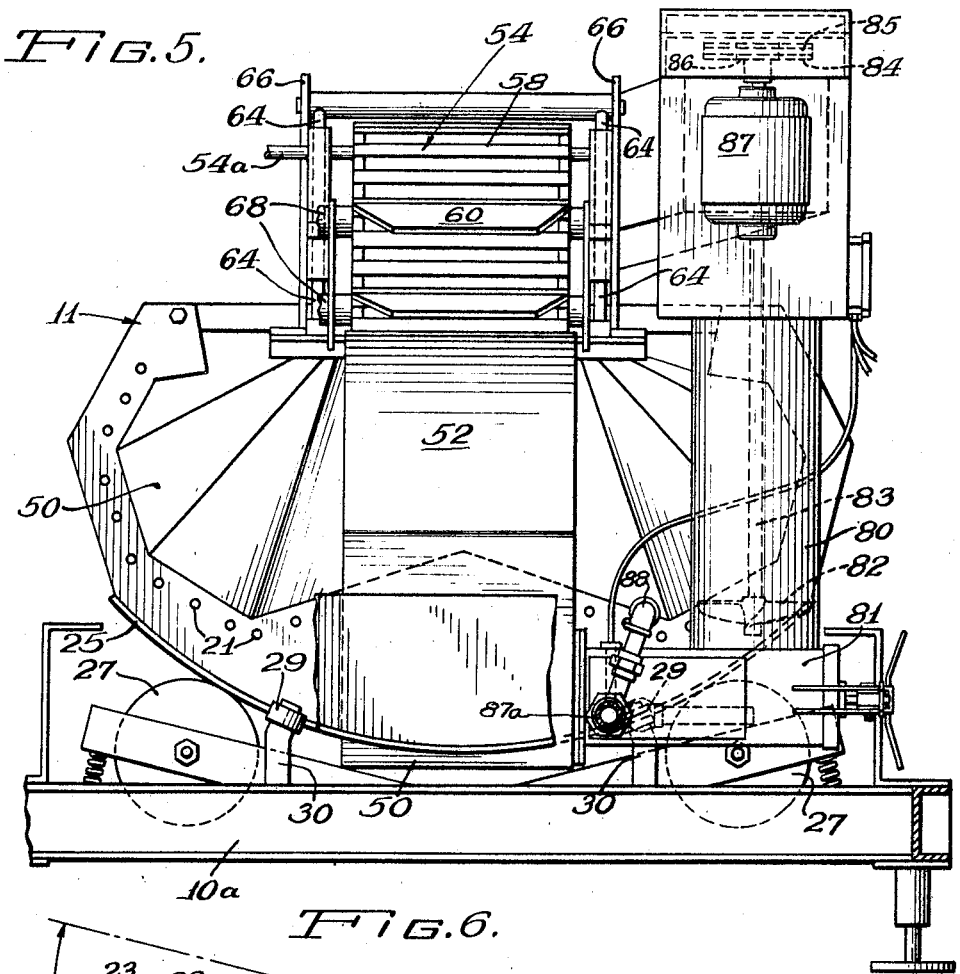
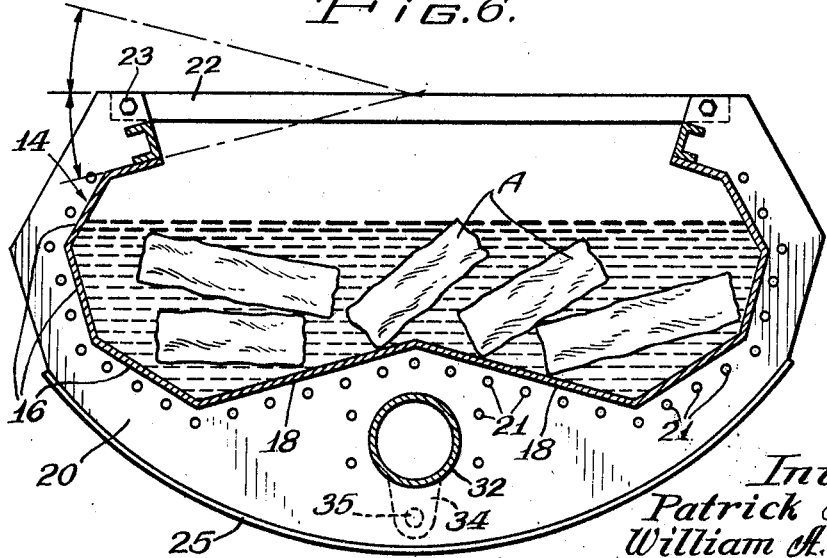

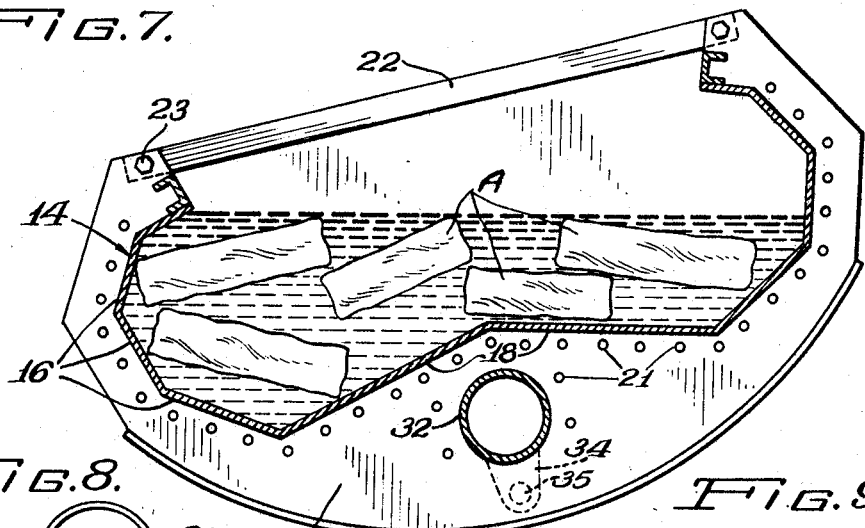
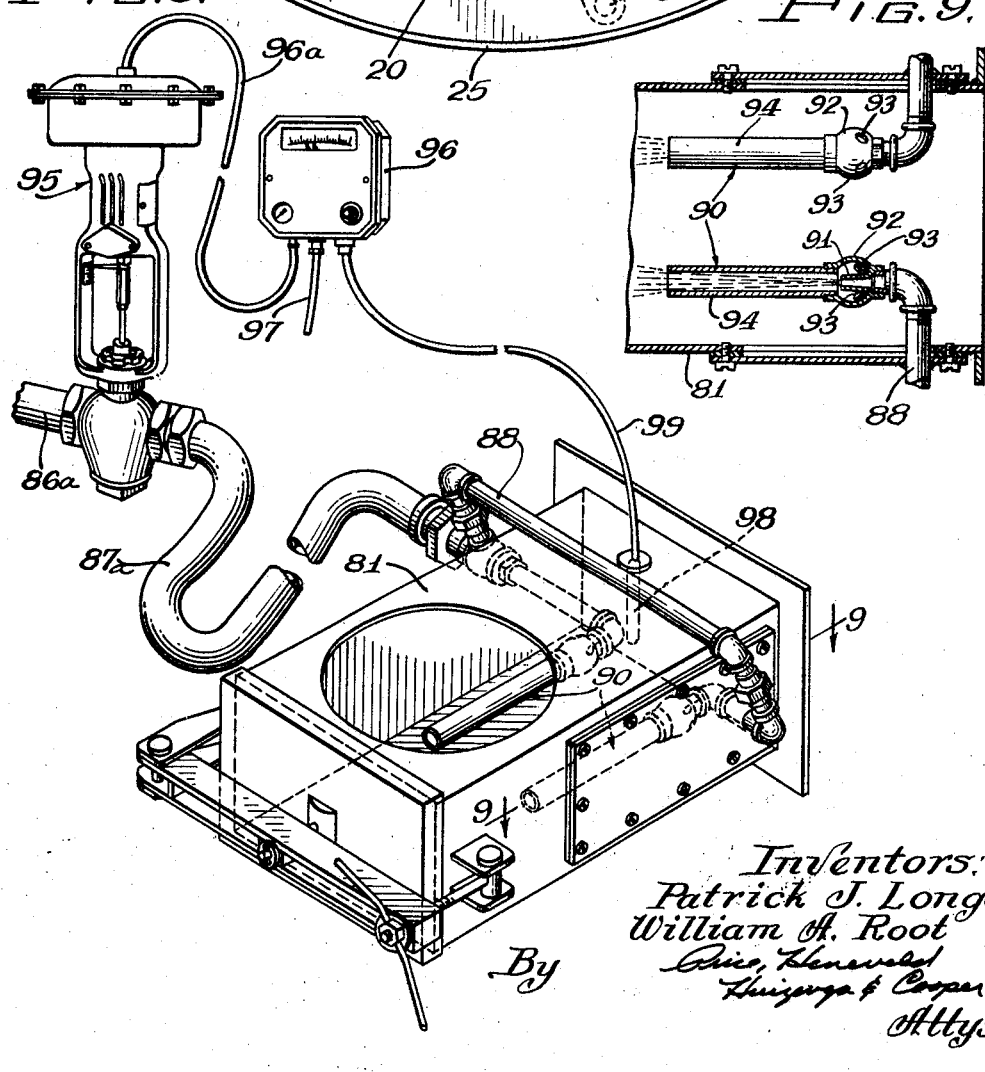
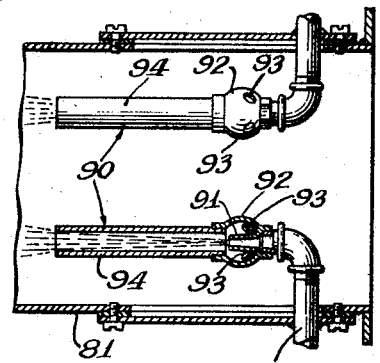

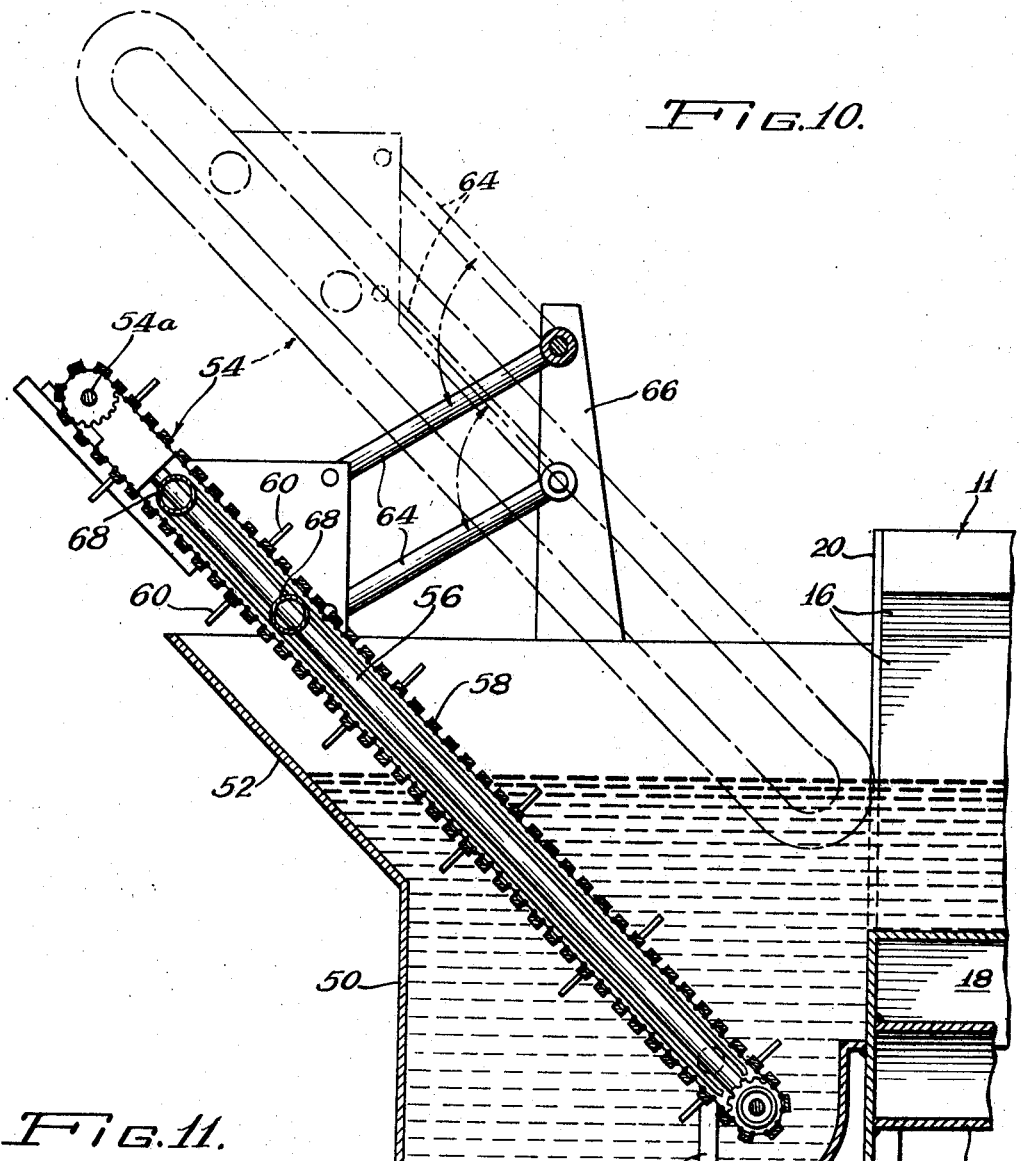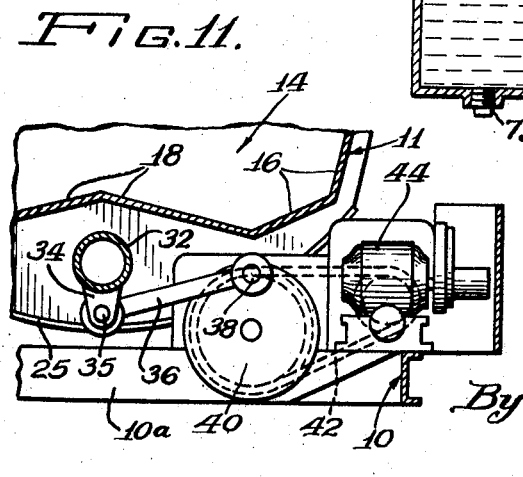

March 3, 1970   P. J. LONGE ET AL   3,498,208
HEAT EXCHANGE APPARATUS
Original Filed March 1, 1965   7 Sheets-Sheet 7
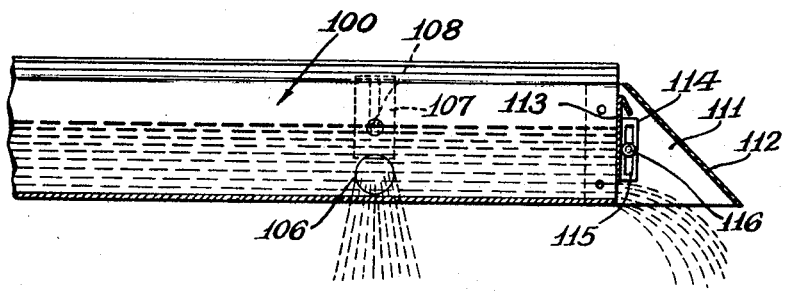
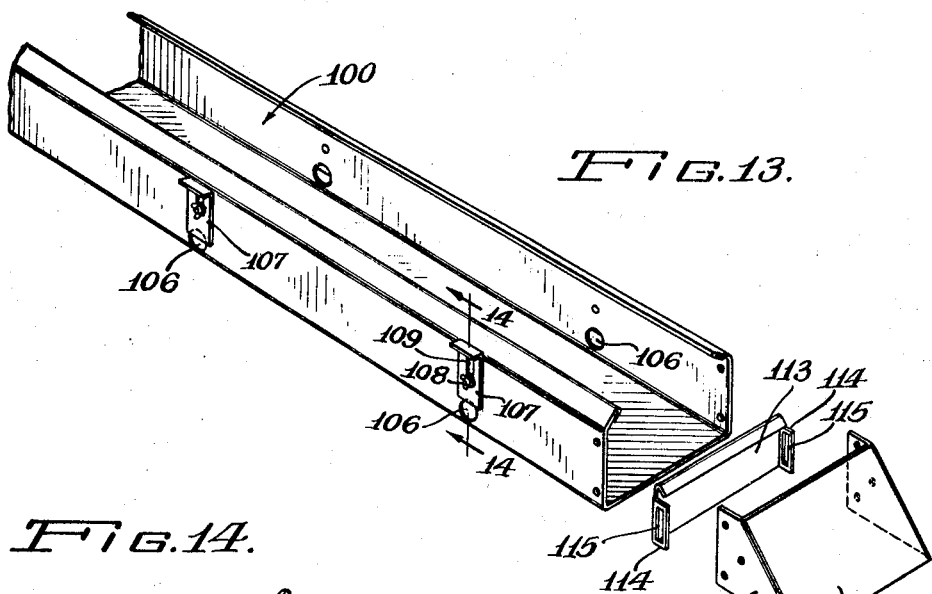
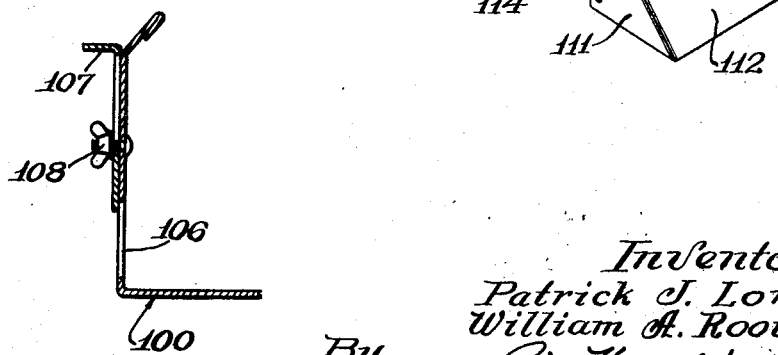
Inventors:
Patrick J. Longe
William A. Root
By
Attys.

United States Patent Office 3,498,208
Patented Mar. 3, 1970

3,498,208
HEAT EXCHANGE APPARATUS
Patrick J. Longe, Bloomfield Hills, Mich., and William A. Root, Ottumwa, Iowa, assignors to International Agri-Systems, Inc., a corporation of Iowa
Original application Mar. 1, 1965, Ser. No. 436,231, now Patent No. 3,402,053, dated Sept. 17, 1968. Divided and this application Mar. 18, 1968, Ser. No. 713,760
Int. Cl. A22c *17/00*
U.S. Cl. 99—234                     11 Claims

ABSTRACT OF THE DISCLOSURE

Apparatus for achieving heat exchange between food products and a heat exchange fluid such as water. The apparatus comprises a rockable tank having the heat exchange fluid continuously recirculated therethrough. A flume is provided along the top of the tank which has spaced adjustable discharge ports whereby the heat exchange fluid may be introduced back into the tank at selective segments thereof.

---

This application is a divisional application of United States patent application Ser. No. 436,231, filed Mar. 1, 1965, now Patent No. 3,402,053.

This invention relates to a novel apparatus for defrosting of frozen food products, prior to performing various other processing operations thereon. While the present method and apparatus lend themselves to defrosting a wide variety of frozen food products, it is especially suitable for defrosting of frozen red meats, poultry and fish.

Food products, such as meats, are purchased in relatively large volumes by certain types of processors, some of which are imported from other countries, and such meat usually is received in a frozen condition and is stored until it is required. Meats and other frozen foods are also purchased at a season of the year when the product is most plentiful and/or is relatively economically priced and is frozen and stored for use at a later time, such as for convenient filling of orders as they are received from customers. For example, beef is usually frozen in blocks of approximately 100 pounds, in a size of approximately 6" x 13" x 28" and is usually made up of cuts of meat in the range of 10 to 18 pounds each. Such meat is capable of various uses such as for making of sausages and so-called "TV Dinners" as well as many other uses. After the meat is defrosted, it is then subjected to further processing, depending on its end use, such as cooking, slicing, grinding, etc.

In currently-used apparatus of this general class, a substantial amount of time and man-hours is consumed in performing the defrosting operation of such frozen food products. This condition causes substantial delay in filling of orders and requires the use of relatively large volumes of warm or hot water or brine or equivalent liquids. At the present time it is usually not possible to process a batch of frozen beef during the same day that the order is received for such meat. For example, blocks of beef in the range of 100 pounds require 15 to 20 hours to defrost, using water or liquid of a temperature range of 60° F. to 70° F. By virtue of the present invention, defrosting of such blocks of beef, using water or liquid having a temperature in the range of 70° F. is accomplished in two to six hours, depending upon the size and the density of the meat as well as the temperature of the beef at the time of commencement of the defrosting operation. By virtue of applicants' invention, it is possible to reduce the time required for defrosting of beef by 60 to 75 percent and the time required in defrosting of poultry by 70 to 80 percent. Thus it is now possible by virtue of applicants' invention for processors to fill orders for food products which had been stored in a frozen state, the same day that such orders are received. Manifestly, such a reduction in time for defrosting effects substantial savings in man-hours as well as time in the handling of the food products.

By the currently-used processes and apparatus, it requires approximately 2½ gallons of warm water to defrost one pound of beef. Applicants' process requires approximately one-half gallon of water to defrost one pound of beef. This great reduction in the quantity of warm water, brine or liquid required for defrosting, will in certain processing plants, effect savings in the range of $1,000 per month.

Sometimes by the use of current processes, attempts are made to speed up the defrosting operation by increasing the temperature of the water or liquid used substantially above 70° F. When this is done, two highly objectionable conditions result, namely, (a) partial cooking of the food product while the defrosting operation is taking place, and (b) the rate of bacterial growth greatly increases which is highly objectionable and is strongly condemned by inspectors for the United States Department of Agriculture.

One of the objects of the present invention is to provide a novel apparatus which effects a great reduction in time and manpower and a reduction of approximately 80 percent of water used for effecting complete defrosting of frozen food products.

Another object of this invention is to provide a novel apparatus which effects substantial savings in quantities of warm water or liquid used in the defrosting operation as well as a great reduction in space requirement.

A further object of this invention is to provide a novel apparatus of the character indicated which performs an efficient defrosting operation on frozen foods at a temperature which insures practical control of bacterial growth during the defrosting operation.

Still another object is to provide novel apparatus of the character indicated which may be located in the processing line to provide continuous produce flow and minimum product handling for certain types of frozen food products.

Many other objects and advantages of this invention will be manifest from the following description taken in connection with the accompanying drawings in which:

FIGURE 2 is a side elevational view of the defrosting apparatus on a scale slightly reduced from the scale of FIGURE 1;

FIGURE 3 is an enlarged side elevational view of one of the individual sections of the defrosting tank;

FIGURE 4 is an enlarged plan view approximately four times the scale of FIGURE 2 of the rear end portion of the defrosting apparatus;

FIGURE 5 is an enlarged rear end view of the defrosting apparatus partly in section, taken substantially as indicated at line 5—5 on FIGURE 2;

FIGURE 6 is an enlarged cross sectional view through one of the sections of the tank of the apparatus, taken substantially as indicated at line 6—6 on FIGURE 2;

FIGURE 7 is a cross sectional view similar to FIGURE 6 showing the tank at one limit of its oscillating movement;

FIGURE 8 is a perspective view of the controls and heating apparatus for the water or liquid in the tank;

FIGURE 9 is a sectional view taken at line 9—9 on FIGURE 8, showing the heating apparatus including steam jets located in the liquid-steam mixing chamber;

FIGURE 10 is an enlarged vertical sectional view through the rear end portion of the apparatus, taken substantially as indicated at line 10—10 on FIGURE 4;

FIGURE 11 is an enlarged fragmentary view through the lower portion of one of the tank sections, taken substantially as indicated at line 11—11 on FIGURE 2, showing the drive mechanism for oscillating the tank;

FIGURE 12 is an enlarged, longitudinal sectional view through the discharge end of the flume, taken as indicated at line 12—12 on FIGURE 1;

FIGURE 13 is a perspective view of the forward portion of the flume and associated elements; and FIGURE 14 is an enlarged vertical section through one of the control gates of the flume, taken as indicated at line 14—14 on FIGURE 13.

Figure 1:
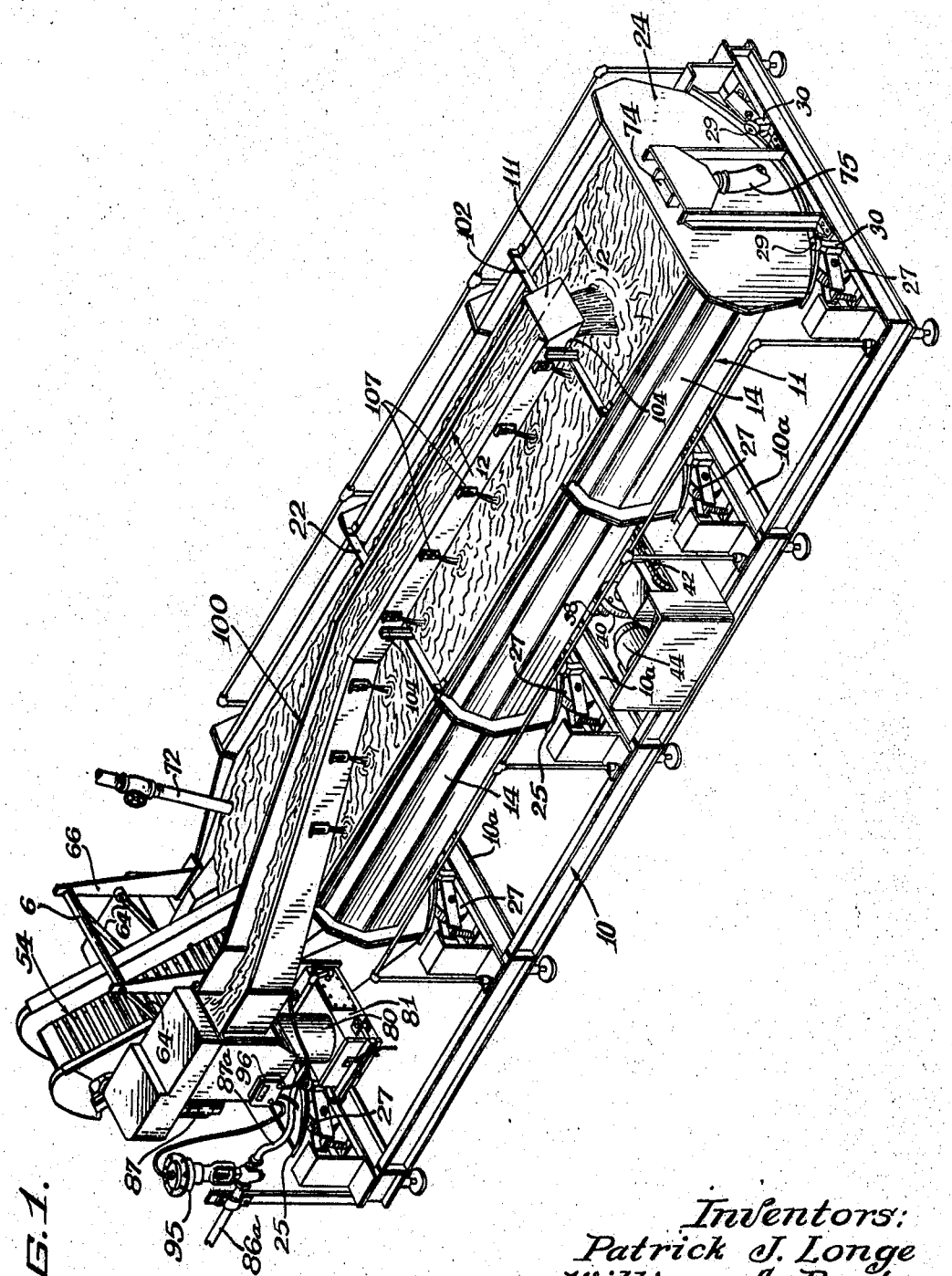
FIGURE 1 is a perspective view of the defrosting apparatus embodying the present invention.

The novel process and apparatus embodying the present invention permits automatic defrosting of frozen food stuffs in an expeditious manner. It is highly desirable to effect defrosting of the frozen food stuffs as rapidly as possible, first to effect substantial savings of time in processing and cost of processing operations, and second, for better control and reduction in growth of bacteria.

The current industry practices and methods for defrosting of frozen food stuffs, such for example, meats require the defrosting operation to be performed by running of water, having a temperature in the range of 60°–70° F., continuously over the frozen product while in stationary tanks. Such practices generally require from 15 to 19 hours for complete defrosting operations. Applicants' novel process for defrosting of frozen food products, such as for example beef, having an initial temperature of zero F., requires approximately six hours for complete defrosting, depending upon the size of the individual frozen product. Where the frozen food product is at a higher ingoing temperature, such as beef at 22° F., the complete defrosting time is approximately five hours or less.

In general, applicants' invention may be briefly described as follows:

An elongated tank is first filled with tap water, brine or other suitable liquid, and when the liquid level reaches a desired height in the tank, a recirculating pump is turned on. The water recirculated is withdrawn from one end of the tank into a mixing chamber where steam is injected for admixture with the liquid for raising the temperature thereof. The recirculating pump causes the heated water to be discharged into a flume which is mounted over and affixed to the tank, and extends substantially the entire length of the tank. The tank and flume and other associated elements are then caused to be rocked or oscillated laterally as a unit. A gate system in the flume is adjustable for distributing the heated liquid throughout the length of the tank so as to insure obtaining relatively uniform temperature of liquid throughout the length of the tank. Suitable controls are provided to maintain the liquid in the tank at a substantially constant predetermined temperature. The temperature of the liquid utilized is preferably in the general range of 70° F., throughout the entire defrosting cycle, and higher temperatures may be used as may be desired, such as for certain types of foods. An overflow system is provided for the tank so as to permit the addition of fresh make-up liquid at a desired rate, such as in the general range of approximately 250 gallons per hour for maintaining a high degree of sanitation of the liquid. The frozen product is continuously and gently agitated in the 70° F. liquid, throughout the entire defrosting cycle, by side-to-side rocking motion of the tank, and by currents produced by recirculation of the liquid in the tank. When the food product is completely defrosted, it is caused to be moved by current flow of the liquid toward one end of the tank where it is removed by a stainless steel unloading conveyor. In defrosting of certain food products, such as pork bellies, the operation may be continuous in that the bellies are caused to be completely defrosted during the time that they are caused to be moved from the ingoing end to the outgoing end of the tank. It has been found that complete defrosting of pork bellies which have an ingoing temperature of minus 15° F. are caused to be totally defrosted and moved from the ingoing end to the outgoing end of the tank in thirty minutes. By virtue of our novel method of defrosting of frozen food products, human handling of the products is reduced to a practical minimum and results in a product that is more uniformly defrosted and cleaner than is possible to obtain by all known currently-used methods of defrosting of frozen food products.

While, as it has been indicated above, the present invention is usable for defrosting of a wide variety of frozen food products, by the use of various types of liquid, we will for convenience hereinafter refer to food products in the nature of red meat or fowl and refer to the liquid employed as being water.

The apparatus herein disclosed comprises a main frame supporting structure 10, on which an upwardly open, elongated tank 11, is mounted for transverse rocking or oscillating movement. The tank for convenience in manufacture, is composed of a plurality of separate, interconnected sections or units as indicated at 14 and as seen in FIGURES 1, 3, 6 and 7 of the drawings. Each of the tank sections is formed of sheet metal, with the opposite sides comprising a plurality of angularly related flat portions 16, which merge at their lower edges into a bottom composed of two flat portions 18, which are connected together, and which extend in an upwardly inclined direction toward each other and join at the longitudinal center of the tank so that the bottom of the tank, a the longitudinal center, is considerably higher than the remaining bottom portions of the tank, for purposes as will hereinafter be described.

At each end of each tank section there is provided a laterally extending flange 20, formed with suitable apertures as indicated at 21, so that adjacent tank sections may be placed in end-to-end alignment, and fixedly secured together by bolts (not shown), extending through the apertures of the two abutting flanges of the adjacent sections. The upper ends of the flanges, at one end of some of the sections are reinforced by a tie bar 22 which is connected at its ends to the flange 20, by bolts 23. The right-hand end tank section is provided with a plate 24, for closing the forward end of the tank and left-hand tank section is of special form as hereinafter described.

The lower portion of each of the flanges 20 of each section is of arcuate formation and to one of which is welded an arcuately-formed track 25. When the tank sections are connected together by bolting on the flanges 20, the assembly is placed for support on the frame 10 with the track members 25, seated upon transversely-spaced-apart sets of rollers 27, journaled on cross members 10a of the frame 10, so as to provide support and guidance for the tank made up of a plurality of sections, during rocking or oscillating movement of the tank. To preclude endwise shifting of the tank with respect to the frame 10, there is provided a pair of transversely-spaced apart guide rollers 29, carried by supports 30, secured to the cross members 10a of the main frame, and engaging the side edges of the tracks, as seen in FIGURE 5 of the drawings.

The flanges 20, at opposite ends of each tank section, are reinforced and interconnected by a relatively large size pipe or tube 32, positioned below the bottom 18 of the tank section, and butt welded at its ends of the inner surfaces of the respective end flanges 20, as seen in FIGURE 10.

Suitable mechanism is provided for rocking or oscillating the tank 11, and which mechanism is such as to make it possible to vary the number of rocks or oscillations of the tank per unit of time. We have found that the number of rocks or oscillations of the tank should be in the range of 14 to 26 per minute. The number of rocks or oscillations of the tank may be varied, depending upon the nature and quantity of frozen food products being defrosted for insuring efficient operation. Said mechanism will now be described in general. Welded to the underside of the pipe 32, of one of the intermediate sections of the tank, is a pair of closely-spaced-apart, downwardly-extending lugs or ears 34, carrying a crank pin 35. A crank arm 36 is connected at one end to the pin 35, and its opposite end is journalled on a crank pin 38, carried on a crank disc 40, in the nature of a pulley, driven by a belt 42 from a motor-driven, speed-reducer assembly, indicated generally at 44, carried on the main frame or support 10. This motor-driven, speed-reducer is of a conventional type and is capable of being quickly and easily adjusted to provide selective variation of speed in order to obtain a desired frequency of rocking or oscillation of the tank.

The rear end portion of the tank is provided with a special tank section formed of sheet metal and indicated at 50, also having a track 25, mounted on trunnions or rollers 27. The end tank section 50 is formed with a rearwardly and upwardly sloping wall portion 52 so as to accommodate within said tank section a bodily movable elevator indicated at 54. The elevator is formed with a unitary frame structure 56, upon which is totally supported a conveyor belt 58 having a plurality of linearly spaced-apart flights 60. Connected to the lower end of the frame of the elevator is a depending bracket 62, adapted to normally rest on the bottom of the tank section 50, as seen in FIGURE 10 of the drawings, for supporting the elevator in a proper operative position. The elevator frame is connected by two pairs of parallel links 64, to an upright support 66, by virtue of which the elevator, as a unit, may be moved up and out of the sump formed in the rear end tank section 50, so that it may assume a position as indicated in the dot and dash outline in FIGURE 10, at which position the elevator and the rear tank section 50, may be thoroughly cleansed for purposes of sanitation. The frame of the elevator is provided with a pair of laterally-extending supports 68, to which may be connected any suitable power source, which may be a hydraulic jack or hand crank adapted for raising or lowering the elevator out of and into operative position with respect to the rear tank section 50. The support 66, is rigidly attached to the rear setcion 50, so that the elevator for all practical purposes is a unitary part of the tank assembly and rocks or oscillates therewith. It is to be understood that suitable power drive means (not shown) for a head shaft 54a, of the elevator is totally supported with the elevator on the rear end section 50 of the tank.

The tank is provided with a source of tap water, through the medium of a valved conduit or pipe 72, for discharging tap water into and adjacent the rear end of the tank 11. The rear section 50 of the tank is welded to the end flange of the last of the conventional sections 14, and has its bottom portion disposed a substantial distance below the bottom of the respective sections 14, comprising the tank, as may be seen in FIGURE 10 of the drawings. Accordingly, water from the tank proper will flow into and fill up the tank section 50 so that there is a uniform level of water throughout all sections of the tank. For removal of the water from the tank upon completion of the defrosting operations, for purposes of cleansing of the tank, a drain plug 73, is provided in the bottom wall of said tank section 50. It is to be understood that a continuous supply of tap water is introduced into the tank during the processing operation for purposes of sanitation. Because of the continuous introduction of fresh tap water, we provide an overflow spout 74, at the front or right hand of the tank, on end wall 24, to maintain a predetermined water level in the tank. The overflow spout serves to discharge overflow water through a flexible conduit 75, to a suitable drain.

Associated with the special or rear tank section 50, is a water recirculating unit comprising an upright duct 80 opening at its lower end into a water steam mixing chamber 81, which is in open communication at one end with interior of rear tank section 50. Positioned within the upright duct 80, immediately above the mixing chamber 81, is an impeller 82, mounted on an upright shaft 83, which is provided at its upper end with a pulley 84, driven by a belt 85 from a pulley 86, mounted on the end of a motor 87. The impeller and its drive mechanism is totally supported on the upright duct 80 and is part of the tank assembly, as may be seen in the drawings.

As may be seen in FIGURE 5 of the drawings, the mixing chamber 81, is in open communication to the sump portion of the rear tank section 50. Water from the tank 11, is caused to flow into the rear section 50, through the mixing chamber and is driven upwardly through the duct 80, by the action of the motor-driven impeller 82, for redistribution throughout the length of the tank as hereinafter described. It is to be understood that the drive mechanism for the impeller shaft 83 is of the variable speed belt type, and by virtue of which the rate of flow of water removed from the rear end of the tank and moved in an upwardly direction through the upright duct 83, may be varied as desired.

To insure efficient defrosting operations of frozen food products, and maintain a desired water temperature in the tank, we provide suitable automatic means for heating of the water in the mixing chamber 81, prior to its being withdrawn upwardly through the duct 80. For this purpose, we provide a thermostatic control means which is responsive to the temperature of the liquid into the mixing chamber 81, and which means serves to heat the water in the mixing chamber so that when it is distributed throughout the length of the tank, the water will be maintained at a predetermined temperature. The medium for heating of the water is steam which is supplied through a main steam supply conduit 86a, to a flexible hose 87a, which is connected by piping 88, to a pair of transversely spaced-apart steam jet assemblies 90. Each of the steam jet assemblies includes a tapered jet 91, surrounded by a housing or body 92, the latter being provided with a plurality of spaced-apart apertures 93, by virtue of which water is drawn, by the entrainment action of the steam jet, into the body 92, for admixing with the steam and thereby heating the water. Connected to the end of the body 92, in registration with the discharge end of the jet 91, is a tube 94, which serves as a medium for rapid heat exchange for heating the water being discharged through and surrounding the tubes 94. The tubes are preferably of substantial length in order to reduce to a practical minimum, the noise incident to the commingling of steam and relatively cool water. The heated water is discharged out of the free ends of the tubes 94, into the mixing chamber 81, and is then withdrawn upwardly through the duct 80, as above described. In order to properly control the amount of steam introduced for heating of the water to a desired or predetermined temperature, a suitable air-control valve 95, is interposed between the main steam supply conduit 86a, and the flexible hose 87a. A suitable thermostatic control 96, of conventional design, serves to control a supply of compressed air for actuating the steam valve 95. Said control 96, and valve 95 are interconnected by an air line conduit 96a, and a suitable compressed air supply line 97, is connected to the control device 96. The control device also includes a thermometer 98, positioned within the mixing chamber 81, which is connected by a temperature responsive element 99 to the main control device 96. The control device 96 is first adjusted to a position corresponding to the desired temperature of the water in the tank 11. Within the control device 96 is a thermostat means (not shown) which is responsive to the action of the temperature actuated element 99, so that when the temperature indicated by the thermometer 98 is less than the temperature to which the instrument is adjusted, the thermostat will be actuated to provide open communication of air pressure from the supply line 97, conduit 96a, to the valve 95, for opening of the valve and permitting introduction of steam, through the hose 87a, for discharge through the jet assemblies 90. As the temperature of the water in the tank rises to the desired or selected temperature for which the control device 96 is adjusted, the control device will either modulate or shut off the supply of steam by closing of valve 95 and thus insure maintaining the temperature of the water in the tank at a desired or set value.

The impeller 82 draws the heated water from the mixing chamber 81 in an upwardly direction, through duct 80, and discharges it into a generally horizontally-extending water flume 100, the main portion of which extends substantially centrally and longitudinally of the tank. The flume, throughout the main portion of its length, is supported by tie bars 22 and 102, which extend across the top of and are secured to the marginal edges of the tank, and the flume is rigidly attached to the tie bars 22 and 102 by angle clips 104. As may be seen in FIGURES 1, 12 and 13, the flume is of generally U-shaped cross section and is provided with a multiplicity of longitudinally spaced-apart discharge openings 106, in each of the upwardly-extending sides or legs of the flume. Each of the openings 106 is individually variable as to size by a valve plate 107, held in an adjusted position by wing nut-bolt 108, extending through a slot 109, in the upright side wall of the flume. By virtue of this construction the valve plate 107 may be raised or lowered for varying the effective size of the openings 106, for varying the quantity of water discharged from the flume at various longitudinally spaced-apart zones of the tank. Thus it is possible to so control the quantity of water being discharged from the flume at the different zones as to insure maintaining relatively uniform temperature of the water throughout the entire length of the tank. Connected to the forward end of the flume as seen in FIGURES 12 and 13, is a discharge head 111, adapted to be bolted to the end portions of side walls of the flume and having a downwardly and forwardly-inclined front wall 112 for directing the water discharging from the end of the flume in a downward direction, adjacent the forward end of the tank. For controlling the volume of water discharged at the forward end of the flume, and thereby controlling the amount of water available, for discharge through the side openings 106, we provide a flume dam 113, having a body portion, positioned to extend transversely of the open forward end of the flume. The dam 113 is formed with a pair of sides or ears 114, each having an upwardly-extending, elongated slot 115, which registers with a wing nut bolt 116, carried by the side walls of the flume head 111, by virtue of which the flume dam may be adjusted vertically as seen in FIGURE 12 to control the amount of water being discharged therebeneath into the forward end of the tank. It will be apparent that in order to insure having adequate heated water available in the flume for discharging through the selectively adjusted discharge openings 106, in the side walls of the flume, the dam plate may be appropriately adjusted to the desired height. When it is desired that a greater amount of the heated water be available for discharge at the forward end of the flume, adjacent the forward end of the tank, the dam plate is raised to the appropriate position in order to insure maintaining a desired temperature of the water throughout the length of the tank.

It may be desirable in processing of various frozen food products to increase the temperature of water at the ingoing end of the tank, i.e., the forward end where the frozen food products are introduced, and this may be quickly and easily accomplished by merely raising the dam plate 113 to a desired height. The adjustable dam plate also has a further advantage for processing of various types of food products. For some food products it may be desirable to increase the volume of water being discharged at the forward end of the flume to produce strong water currents and thereby causing longitudinal movement of the frozen food product in the tank during the defrosting operation. The same end result is also attainable by adjusting the speed of rotation of the impeller 82, for varying the rate of recirculation of the water in the tank.

In the operation of the apparatus for carrying out our novel process, the tank 11 is first filled with water, preferably warm water, in the general range of 70° F. The thermostat control device 96 is then adjusted so as to obtain a desired temperature of the water throughout the tank, and at the same time the impeller motor 87 is operated and the drive adjusted for obtaining a desired rate of recirculation of the water in the tank. The motor speed reducer 44, is then set into operation for effecting a rocking or oscillating movement of the tank in a lateral direction, and if desired, the elevator 54, is likewise caused to operate, or it may be set into operation immediately prior to the time that it is desired to remove the defrosted food products from the tank. As may be noted from the drawings, the angle of oscillation or rocking of the tank is relatively small, being in the general range of 13° (13 degrees) above and below horizontal, as seen in FIGURE 6 of the drawings. Frozen food products, herein shown as blocks of frozen beef A, composed of pieces in the range of 10 to 15 pounds each, or any other frozen products to be defrosted, such as pork bellies, fowls or turkeys are then introduced into the tank at the right hand end of the tank as seen in FIGURE 1 of the drawings. The water recirculating impeller 82, functions to continuously withdraw water from the tank, adjacent the bottom of the special section 50, into the mixing chamber 81 where it is heated, and discharges it into the flume 100. Water is caused to be discharged from the flume into the tank through the side wall openings 106, or below the dam plate 113, or through both sets of discharge outlets. The water within the tank which is maintained at a preselected temperature, is continuously recirculated, setting up water currents, which together with the agitation of the water caused by the oscillating or rocking action of the tank, causes the frozen food products to be freely and unrestrictedly turned, rolled and repositioned in a partially buoyant state. Simultaneously with such action on the frozen food products, the water currents tend to move such products rearwardly in the tank toward the outgoing end where, when it is desired, and the products are completely defrosted, they are removed therefrom by the elevator 54, and discharged into a suitable container or onto a conveyor for further processing.

Because of the agitation of the water induced by the rocking action of the tank, and the recirculation of the water, the food products are continuously subjected to a gentle agitating action wherein the water is caused to continuously flow over and around and into any cavities of the food product to continuously exert a cleansing or washing action thereon, while simultaneously effecting a defrosting of the food products. As seen in FIGURES 6 and 7 of the drawings the frozen food products are caused to be continuously and freely moved and repositioned as a result of the sloshing action of the water in the tank created by the water being moved from side to side incident to the rocking action of the tank. Such gentle, oscillating, action provides sufficient agitation for the entire body of water in the tank for effecting a rapid heat exchange between the food products and the body of water. The gentle, agitating action of the water is a result of the novel form of the bottom of the tank, wherein a portion thereof extends upwardly a substantial distance above other portions of the bottom of the tank and the angularly related side wall portions of the tank serve to further augment the agitation imported to the body of water.

The food products are caused to progress inwardly from the ingoing to the outgoing end of the tank by the combined action of agitation of the water due to the rocking action, together with the recirculation of the body of water through the impeller mechanism withdrawing water from the bottom of the rear tank section 50, and discharging it into the flume 100, and the water flowing through the discharge openings 106 of the flume, with a substantial portion of the water being discharged adjacent the ingoing end of the tank.

It will be apparent that due to the continuous agitation of the water in the tank, hte layer of water in direct contact with the food products is continuously being replaced by warmer water, and thus serves to effect a rapid rate of heat exchange for defrosting of the food products. Without such agitated water action, the film of water in direct contact with the food products tends to serve as an insulator and tends to reduce the rate of heat exchange.

The supply of tap water to the tank may be either intermittent or continuous as long as fresh water is introduced at least at frequent intervals so as to insure maintaining adequate degree of sanitation of the water while it is being utilized for performing a defrosting operation upon the food products.

Numerous tests as to the efficiency of the present invention have been made and for illustration, reference will be made to some of the tests.

TEST NO. A

Product: Beef.—100 lb. blocks—6" x 18" x 28"—consisting of 10 to 12 lb. cuts
Total weight.—7,100 lbs.
Product temperature.—0° F.
Water temperature.—70° F.
Defrosting time.—5 hours

TEST NO. B

Product: Turkeys.—225 lb. barrels
Total weight.—4,700 lbs.
Product temperature.—0° F.
Water temperature.—90° F.
Defrosting time.—2 hours

TEST NO. C (Comparison test).—Applicant's method

Product: Beef.—60–100 lb. blocks consisting of 10 lb. cuts (average)
Total ingoing weight.—8,000 lbs.
Product temperature.—Ingoing —5° F.
Water temperature.—70° F.
Defrosting time.—6.5 hours

CURRENTLY-USED METHOD

Product: Beef.—60–100 lb. blocks consisting of 10 lb. cuts (average)
Total ingoing weight.—1,800 lbs.
Product temperature.—Ingoing —5° F.
Water temperature.—70° F.
Defrosting time.—19.5 hours

TEST NO. D

Product: Pork bellies (bacon).—16" x 22" x 1¾"
Total weight.—650 lbs.
Product temperature.—Ingoing —15° F.
Water temperature.—70° F.
Defrosting time.—½ hour From the foregoing tests, which have been set out merely as exemplary of the results of practicing the present invention, it will be readily recognized that many advantages result therefrom. The time required in the defrosting cycle is greatly reduced and which permits processors or packers to better schedule production, keep backlog of defrosted food products to a minimum, and reducet lead time for processing which insures more rapid service to the customer. In addition to the foregoing, the present invention results in great reduction in space requirements for performing defrosting operations on frozen food products; results in greatly reducing water usage (estimated at approximately 80%); greatly reduces manpower requirements; and for certain uses permits location of defrosting apparatus in a processing line so as to provide for continuous product flow, together with minimum product handling. By supplying fresh water to the tank during the defrosting operation, it results in removal of blood and particles of residue from the food product. Because it is possible to efficiently defrost the food products by using water of a relatively low temperature, i.e. 70° F. it greatly reduces bacterial growth in the food product, as well as results in a cleaner and more sanitary product when it has been completely defrosted for further processing.

It is a well-known fact that bacterial growth above 70° is very rapid and the U.S. Department of Agriculture is always greatly concerned about processing operations wherein the food product is subject to high rates of bacterial growth. It is to be recognized that in the use of the apparatus of the present invention, it is possible and in some instances desirable, to heat the water in the tank to a temperature in excess of 70° and which will greatly expedite defrosting of the food product with the attendant result in substantial saving of time. This procedure, however, is preferable only, where the food product after being defrosted is immediately subjected to the further and final processing, including cooking.

Although we have herein shown and described certain preferred embodiments of our invention, both as to the process and apparatus thereof, manifestly it is capable of modification and rearrangement without departing from the spirit and scope thereof. We do not wish, therefore, to be understood as limiting this invention to the precise process and apparatus as herein disclosed.

The embodiments of the invention in which an exclusive property or privilege is claimed are defined as follows.

What is claimed is:

1. Apparatus of the character described comprising a support, an elongated, upwardly open tank adapted to contain liquid, mounted for lateral rocking movement on the support, means for rocking the tank, said tank being formed for causing agitation of the liquid incident to said rocking movement, a sump at one end of the tank, pump means for withdrawing liquid from the sump, means associated with the pump means for conveying the withdrawn liquid and reintroducing it into the tank at a plurality of longitudinal spaced apart zones, and means for heating the withdrawn liquid prior to reintroduction into the tank.

2. The apparatus as set forth in claim 1 which further comprises thermostatic control means responsive to the temperature of the liquid at said one end of the tank for controlling said heating means.

3. The apparatus as set forth in claim 2 wherein said heating means includes a steam outlet nozzle opening into the sump and a valve for controlling discharge of steam through the nozzle and means associated with the valve and connected to the thermostatic control means to maintain the liquid in the tank at a desired temperature.

4. Apparatus of the character described comprising a support, an elongated, upwardly open tank adapted to contain liquid, mounted for lateral rocking movement on the support means for rocking the tank, said tank being formed for causing agitation of the liquid incident to said rocking movement, and thermostatic controlled means for introducing hot liquid into the tank at a plurality of longitudinally spaced apart zones for maintaining the liquid in the tank at a desired temperature.

5. Apparatus of the character described comprising a support, an elongated, upwardly open tank adapted to contain liquid, mounted for lateral rocking movement on the support, means for rocking the tank, said tank being formed for causing agitation of the liquid incident to said rocking movement, a liquid flume mounted on and extending substantially the length of the tank and rockable with the tank, pump means for withdrawing liquid from one end of the tank and discharge it into the flume, said flume being formed for discharging liquid therefrom into the tank at a plurality of longitudinally spaced apart zones and means for heating the withdrawn liquid prior to discharge into the flume.

6. The apparatus as set forth in claim 5 wherein said flume is provided with a plurality of longitudinally spaced apart openings and which further comprises means for varying the effective size of said openings; and an adjustable dam at the discharge end of the flume for controlling the amount of liquid to be discharged in said zones.

7. Apparatus of the character described comprising a support, an elongated, upwardly open tank adapted to contain liquid, mounted for lateral rocking movement on the support, means for rocking the tank, said tank being formed for causing agitation of the liquid incident to said rocking movement, a sump at one end of the tank, pump means for withdrawing liquid from the sump, and means associated with the pump means for conveying the withdrawn liquid and reintroducing it into the tank at a plurality of longitudinally spaced apart zones.

8. In a heat-exchange apparatus having an elongated tank adapted to be filled with heat-exchange fluid and means for withdrawing said fluid near one extremity of said tank and transferring at least a portion thereof to a location in said tank near the opposite extremity of said tank for recirculation therethrough, the improvement comprising means associated with said transfer means for discharging at least a portion of said withdrawn fluid back into said tank at at least one location longitudinally spaced from said opposite extremity location during transfer of said fluid so as to create at least two longitudinally spaced zones having temperatures maintainable at different levels.

9. The apparatus as set forth in claim 8 wherein said discharging means are adjustable.

10. The apparatus as set forth in claim 9 wherein said transferring means comprises at least one elongated flume communicating between opposite extremities of said tank along which said fluid is adapted to flow under the influence of gravity and wherein said discharging means comprises at least one adjustable part along the length of said flume intermediate the extremities thereof.

11. The apparatus as set forth in claim 10 which further comprises means for discharging articles from one extremity of said tank and means for pumping said heat exchange fluid from said one extremity of said tank into said flume.

References Cited

UNITED STATES PATENTS

| | | | |
|---|---|---|---|
| 873,269 | 12/1907 | Sargent | 126—379 |
| 979,796 | 12/1910 | Pinkney | 126—379 |
| 1,366,431 | 1/1921 | Strohmaier et al. | 126—379 |
| 1,892,028 | 12/1932 | Alderfer | 62—64 |
| 2,920,462 | 1/1960 | Roser et al. | 62—376 XR |
| 3,091,099 | 5/1963 | Sharp | 62—63 XR |
| 3,384,002 | 5/1968 | Bonuchi et al. | 99—234 |

WALTER A. SCHEEL, Primary Examiner

J. M. BELL, Assistant Examiner

U.S. Cl. X.R.

62—63, 64, 375; 126—379; 259—75